US009808922B2

(12) United States Patent
Breschi et al.

(10) Patent No.: US 9,808,922 B2
(45) Date of Patent: Nov. 7, 2017

(54) DEVICE FOR REMOVING A VALVE AND CAGE ASSEMBLY FROM A MACHINE

(71) Applicant: Nuovo Pignone Srl, Florence (IT)

(72) Inventors: Tommaso Breschi, Florence (IT); Andrea Tenze, Florence (IT); Filippo Erbaggio Bracciali, Florence (IT); Elena Gallina, Florence (IT)

(73) Assignee: Nuove Pignone SrL, Florence (IT)

( * ) Notice: Subject to any disclaimer, the term of this patent is extended or adjusted under 35 U.S.C. 154(b) by 61 days.

(21) Appl. No.: 14/405,813

(22) PCT Filed: Jun. 7, 2013

(86) PCT No.: PCT/EP2013/061841
§ 371 (c)(1),
(2) Date: Dec. 5, 2014

(87) PCT Pub. No.: WO2013/182696
PCT Pub. Date: Dec. 12, 2013

(65) Prior Publication Data

US 2015/0183102 A1 Jul. 2, 2015

(30) Foreign Application Priority Data

Jun. 8, 2012 (IT) ................................ FI2012A0113

(51) Int. Cl.
*B23P 19/04* (2006.01)
*B25B 27/24* (2006.01)
(Continued)

(52) U.S. Cl.
CPC ............ *B25B 27/24* (2013.01); *B25B 27/023* (2013.01); *B25B 27/062* (2013.01); *F04B 39/10* (2013.01);
(Continued)

(58) Field of Classification Search
CPC ..... B25B 27/24; B25B 27/062; B25B 27/023; F04B 39/14; F04B 53/22; F04B 53/10; Y10T 29/53596
See application file for complete search history.

(56) References Cited

U.S. PATENT DOCUMENTS 1,493,534 A 5/1924 Otis
1,492,877 A 1/1926 Davis
(Continued)

FOREIGN PATENT DOCUMENTS

FR 2876939 A1 4/2006
JP 58191972 U 12/1983
(Continued)

OTHER PUBLICATIONS

Italian Search Report and Written Opinion dated Sep. 21, 2012 which was issued in connection with Italian Patent Application No. FI2012A000113 which was filed on Jun. 8, 2012.
(Continued)

*Primary Examiner* — Monica Carter
*Assistant Examiner* — Nirvana Deonauth
(74) *Attorney, Agent, or Firm* — GE Global Patent Operation

(57) ABSTRACT

The device comprises an anchoring plate configured for anchoring the device to a machine casing. The device further comprises a terminal plate connected to the anchoring plate at a distance there from, and a slide arranged for movement between the anchoring plate and the terminal plate. The device further includes a connecting arrangement configured for connecting the slide to a valve and cage assembly to be removed from the machine.

20 Claims, 12 Drawing Sheets

(51) Int. Cl.

| | |
|---|---|
| ***F04B 39/10*** | (2006.01) |
| ***F04B 39/14*** | (2006.01) |
| ***F04B 53/10*** | (2006.01) |
| ***F04B 53/22*** | (2006.01) |
| ***B25B 27/02*** | (2006.01) |
| ***B25B 27/06*** | (2006.01) |

(52) U.S. Cl.

CPC .............. *F04B 39/14* (2013.01); *F04B 53/10* (2013.01); *F04B 53/22* (2013.01); *Y10T 29/53596* (2015.01)

(56) References Cited

U.S. PATENT DOCUMENTS

| | | | | |
|---|---|---|---|---|
| 1,650,024 | A | 11/1927 | Maxwell | |
| 4,034,458 | A * | 7/1977 | Ford | B25B 27/062 29/259 |
| 4,128,930 | A * | 12/1978 | Tomlinson | F16L 55/12 138/97 |
| 4,406,182 | A * | 9/1983 | Antone | B67B 7/066 29/266 |
| 5,533,245 | A | 7/1996 | Stanton | |
| 6,560,836 | B1 * | 5/2003 | Briscoe | B25B 27/023 29/259 |
| 7,520,041 | B1 * | 4/2009 | Aguilar | B25B 27/023 29/255 |
| 8,191,862 | B2 * | 6/2012 | Arabian | B25B 27/304 254/10 B |
| 2005/0015979 | A1 * | 1/2005 | Walters | B25B 27/0035 29/888.011 |
| 2008/0206069 | A1 | 8/2008 | Sarshar et al. | |
| 2009/0108242 | A1 * | 4/2009 | Arabian | B25B 27/304 254/10.5 |

FOREIGN PATENT DOCUMENTS

| | | | |
|---|---|---|---|
| JP | 60220279 | A | 11/1985 |
| JP | 0243187 | U | 3/1990 |
| JP | 0985637 | A | 3/1997 |
| JP | 2010117031 | A | 5/2010 |
| RU | 2228833 | C2 | 5/2004 |
| SU | 1518115 | A1 | 10/1989 |

OTHER PUBLICATIONS

International Search Report and Written Opinion dated Oct. 7, 2013 which was issued in connection with PCT Patent Application No. PCT/EP13/061841 which was filed on Jun. 7, 2013.

A Russian Office Action issued in connection with corresponding RU Application No. 2014147139 on Mar. 23, 2017.

Unofficial English Translation of Japanese Search Report issued in connection with corresponding JP Application No. 2015515542 on Apr. 6, 2017.

Unofficial English Translation of Japanese Office Action issued in connection with corresponding JP Application No. 2015515542 on Apr. 18, 2017.

* cited by examiner

STATE OF THE ART

DEVICE FOR REMOVING A VALVE AND CAGE ASSEMBLY FROM A MACHINE

BACKGROUND OF THE INVENTION

The embodiments of the subject matter disclosed herein generally relate to devices for removing a valve and cage assembly from a housing or seat formed in the machine casing, for example the casing of a reciprocating machine, such as a reciprocating compressor.

Automatic valves, for example so called ring valves, are commonly used in a variety of machines, in particular reciprocating compressors. A reciprocating compressor usually comprises a casing with a cylinder formed therein, inside which a piston is slidingly and reciprocatingly movable under the control of a crank and connecting rod arrangement. The cylinder is in fluid communication with a fluid inlet and a fluid outlet. Automatic control valves are arranged in both a suction duct and a discharge duct leading to the fluid inlet and the fluid outlet respectively. These valves are usually mounted, along with a cage, in respective seats provided in the casing of the machine.

FIG. 1 illustrates a section of a double-effect reciprocating compressor 1 of the current art. The compressor 1 comprises a compressor casing 3 with a cylinder 5 divided into a first chamber 7A and a second chamber 7B. A piston 9 is arranged in the cylinder 5 for reciprocal movement according to double arrow f9. The movement of the piston is controlled by a piston rod 11, connected to a crosshead 13. The cross-head 13 moves reciprocatingly along runners 15 and is pivotally connected at 16 to a connecting rod 17. Said connecting rod 17 is in turn connected to a crank shaft 19, which rotates around a shaft axis 20 according to arrow f19.

A fluid suction duct 21 can be selectively placed in fluid communication with chamber 7A and chamber 7B through automatic suction valves 23 and 24. A fluid discharge duct 25 can be selectively placed in fluid communication with chamber 7A and chamber 7B through respective automatic discharge valves 27 and 29. The automatic valves 23, 24, 27 and 29 are usually ring valves.

FIG. 2 illustrates a cross section, according to line II-II in FIG. 1, of the automatic discharge valve 27 and relevant cage. The remaining ring valves 23, 24 and 29 are substantially identical to the discharge valve 27.

The automatic discharge valve 27 comprises a valve seat 31 and a valve guard 33. The valve seat 31 and valve guard 33 are connected to one another by means of a central screw 35, leaving a space there between. A set of shutting rings 37 are arranged in the space between the valve seat 31 and the valve guard 33. Each shutting ring 37 is elastically biased by a respective set of springs 32 in a closed position against the valve seat 31.

The automatic discharge valve 27, similarly as other automatic discharge valve 29 and suction valves 23 and 24 of the reciprocating compressor 1, is arranged in a respective housing 39 formed in the compressor casing 3. The automatic ring valve 27 is mounted in housing 39 along with a cage 41. The valve and cage assembly 27, 41 is retained in the housing 39 by means of a valve cover 43, which closes the housing 39. The valve cover 43 is screwed on the compressor casing in a sealingly closed position by means of stud bolts 45 and nuts 46. The cage 41 is comprised of apertures 42 which place the interior of the cage 41 into fluid communication with the respective suction or discharge duct 21 or 25.

Usually the discharge valves 27 and 29 are arranged in the lower part of the reciprocating compressor 1, as shown in FIG. 1, while the suction valves 23 and 24 are arranged in the upper part of the reciprocating compressor 1. When the valve and cage assembly 27, 41 is mounted in the housing 39, a retaining ring or snap ring 47 is used for retaining the valve and cage assembly 27, 41 in the housing 39 prior to mounting the valve cover 43 on the compressor casing 3.

When the discharge valve 27 (or any other valve of the reciprocating compressor 1) must be removed, e.g. for replacement or maintenance, the valve cover 43 and the retaining ring 47 must be removed and the valve and cage assembly 27, 41 must be withdrawn from the housing 39.

The assembly formed by the cage 41 and the valve 27 can be particularly cumbersome and heavy, especially in large machineries. Typically a valve and cage assembly of this kind can weigh between 15 and 50 kg.

Moreover, as noted above, the valve and cage assembly on the discharge side is usually arranged in the lower part of the reciprocating compressor 1. When the valve cover 43 and then the retaining ring 47 are removed, the valve and cage assembly 27, 41 will slide out of the housing 39 under the effect of gravity. This makes the disassembly of the valve and cage assembly particularly critical especially in large machineries.

BRIEF SUMMARY OF THE INVENTION

The present disclosure concerns a device or tool designed and configured to remove the valve and cage assembly under safety conditions.

According to one exemplary embodiment, a device is provided, comprising: an anchoring plate configured for anchoring the device to a machine casing; a terminal plate connected to the anchoring plate at a distance there from; a slide arranged for movement between the anchoring plate and the terminal plate; a connecting arrangement configured for connecting the slide to a valve and cage assembly to be removed from said machine.

The device is mounted on the machine casing, around the opening of the valve housing from which the valve and cage assembly must be removed. The slide is constrained to the valve and cage arrangement and moved away from the machine casing, thus removing the valve and cage assembly from the relevant housing. The operator is thus relieved from the efforts of manually grasping and pulling the valve and cage assembly out of the housing and of supporting the entire weight of the assembly once it has been removed from the housing.

According to some embodiments of the subject matter disclosed herein, the device comprises a guide extending between the anchoring plate and the terminal plate. The slide is slidingly movable along the guide. For example, the guide can comprise one or more bars extending from the anchoring plate to the terminal plate. The slide can be slidingly engaged, e.g. with the aid of bushings, to the bars. A mover can be provided to aid the operator in the extraction movement. The mover can be designed and arranged to move the slide along the guide between the anchoring plate and the terminal plate. The mover can be hand-operated. It can be comprised of a threaded bar meshing with a nut constrained to the slide, for example. A crank can be provided for manual rotation of the threaded bar. The use of an actuator is also not excluded, e.g. an electric or hydraulic motor or any other servo-mechanism for rotating the threaded bar. Hydraulic or mechanical jacks could be used instead of a rotating threaded bar, in order to move the slide.

In some embodiments, the connecting arrangement for connecting the slide to the valve and cage assembly can comprise a tie-rod with a first end, configured for connection to a valve to be removed, and with a second end, configured for connection to the slide. A cage blocking member can be provided, designed and configured to be removably engageable to the tie-rod in a position between the first end and the second end of the tie-rod. The cage blocking member, once mounted on the tie-rod, can extend transversely to the tie-rod across the width of the valve housing, such as to engage the edge of the cage housed in the valve housing. By locking the cage blocking member on the tie-rod, the valve, the cage, the cage blocking member and the tie-rod form a unit which can be extracted from the valve housing by anchoring the tie-rod to the slide and moving the slide away from the anchoring plate.

In some embodiments, the slide is provided with an aperture extending through the slide, arranged for receiving and locking the tie-rod to the slide by means of a nut screwed on said second end of the tie-rod, or by means of any other locking member or device.

The anchoring plate can be constrained to the casing by means of the stud bolts provided on the casing for closing the cover of the valve housing. In some embodiments, the anchoring plate has a plurality of differently arranged through holes to adapt the anchoring plate to different valve housings, having a different number of stud bolts or a different stud bolts arrangement.

In order to allow the slide to approach the casing without colliding against the stud bolts around the valve housing, in some embodiments the slide comprises through holes or apertures for receiving said stud bolts when the slide is moved adjacent the machine casing. This allows having a shorter tie-rod, since the slide can be moved very near to the machine casing in order to be connected to the tie-rod.

For improving the safety of use, the device can comprise an anti-slip plug configured for insertion into a hole of a valve cage, to prevent accidental slipping of the valve and cage assembly from the relevant housing, once the cover and the cage retention ring have been removed.

The subject matter disclosed herein also comprises a system comprised of: a reciprocating compressor with at least one valve and cage assembly; and at least one device for removing the valve and cage assembly, as described above.

Features and embodiments are disclosed here below and are further set forth in the appended claims, which form an integral part of the present description. The above brief description sets forth features of the various embodiments of the present invention in order that the detailed description that follows may be better understood and in order that the present contributions to the art may be better appreciated. There are, of course, other features of the invention that will be described hereinafter and which will be set forth in the appended claims. In this respect, before explaining several embodiments of the invention in details, it is understood that the various embodiments of the invention are not limited in their application to the details of the construction and to the arrangements of the components set forth in the following description or illustrated in the drawings. The invention may be capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which the disclosure is based, may readily be utilized as a basis for designing other structures, methods, and/or systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

A more complete appreciation of the disclosed embodiments of the invention and many of the attendant advantages thereof will be readily obtained as the same becomes better understood by reference to the following detailed description when considered in connection with the accompanying drawings, wherein.

DETAILED DESCRIPTION OF EMBODIMENTS OF THE INVENTION

Figure 1:
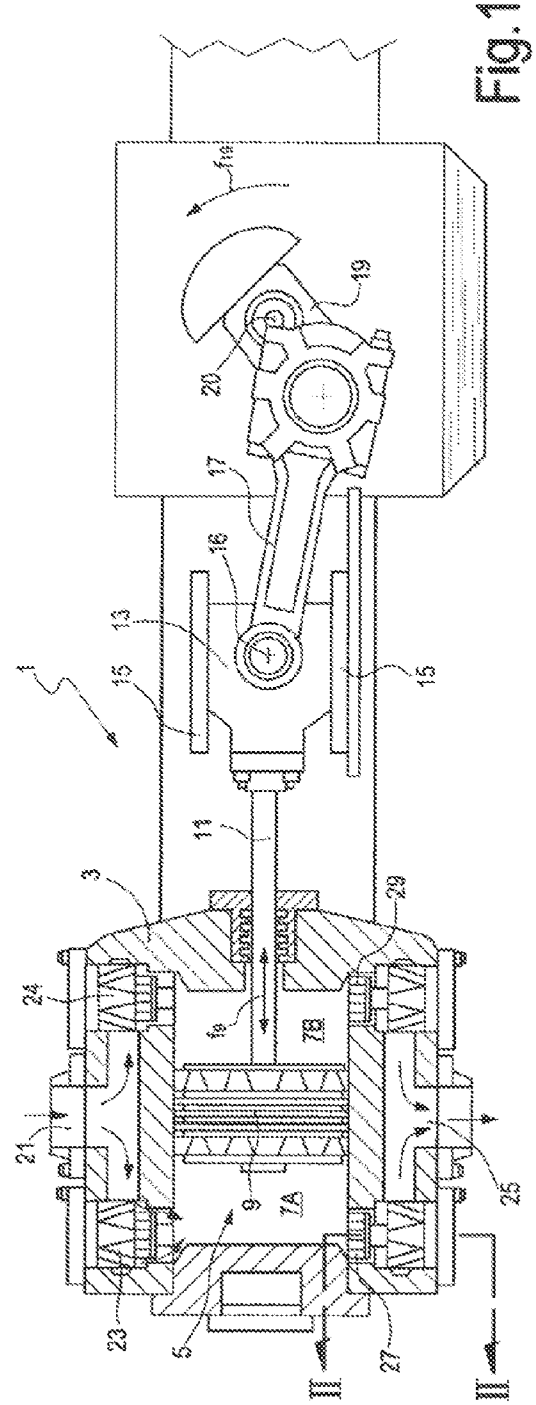
FIG. 1 illustrates a sectional view of a reciprocating compressor with automatic ring valves on the suction side and discharge side.

The following detailed description of the exemplary embodiments refers to the accompanying drawings. The same reference numbers in different drawings identify the same or similar elements. Additionally, the drawings are not necessarily drawn to scale. Also, the following detailed description does not limit the invention. Instead, the scope of the invention is defined by the appended claims.

Reference throughout the specification to "one embodiment" or "an embodiment" or "some embodiments" means that the particular feature, structure or characteristic described in connection with an embodiment is included in at least one embodiment of the subject matter disclosed. Thus, the appearance of the phrase "in one embodiment" or "in an embodiment" or "in some embodiments" in various places throughout the specification is not necessarily referring to the same embodiment(s). Further, the particular features, structures or characteristics may be combined in any suitable manner in one or more embodiments.

In the drawings, a device for removing a valve and cage assembly from the valve housing of a reciprocating compressor is designate 100 as a whole. In the embodiment disclosed in the attached drawings, the device 100 comprises an anchoring plate 101, designed to be attached to the casing of the reciprocating compressor, around a housing of a valve and cage assembly to be removed. The anchoring plate 101 is connected to a terminal plate 103 arranged at a distance D therefrom by means of a distancing element. The anchoring plate 101 is shaped so that it will not obstruct the removal of the valve and cage assembly from the valve housing, once the device is attached to the compressor casing. The anchoring plate has an approximately semi-circular shape. The terminal plate 103 is approximately semi-circular in shape.

Figure 7A:
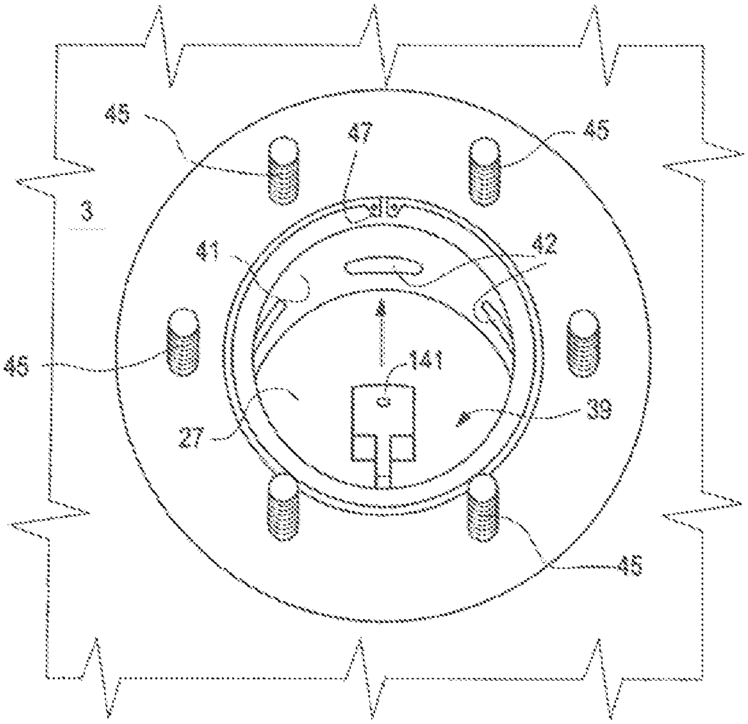
FIGS. 7A-7P illustrates a sequence of operations for removing a valve and cage assembly from the relevant housing.
Figure 7B:
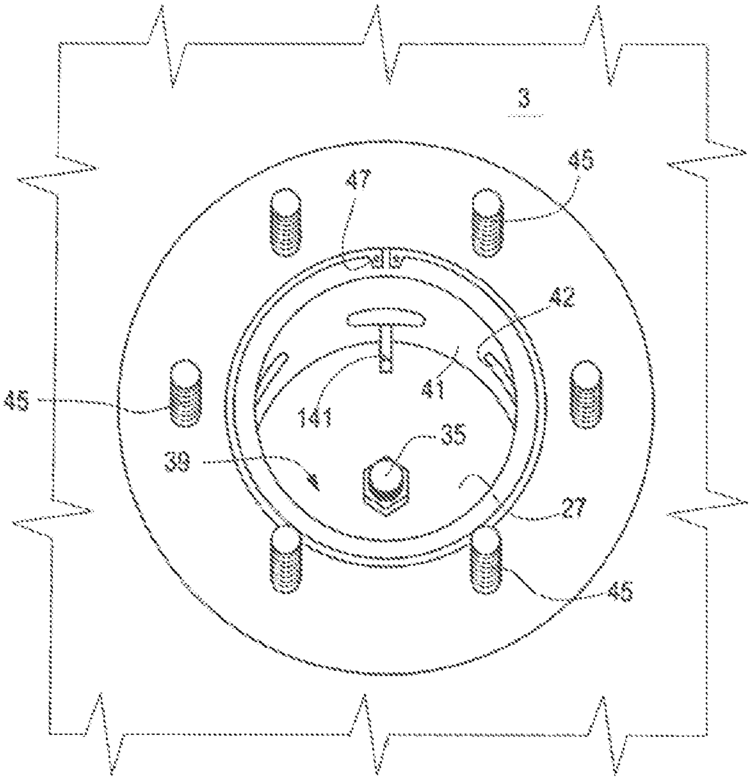

The structure of the valve and cage removing device will first be described, reference being made to FIGS. 3 to 6. In these figures the valve and cage assembly, again labeled 27, 41 and the valve housing, labeled 39, are shown in dashed lines. The sequence of FIGS. 7A-7P illustrates the operations carried out with the device of FIGS. 3 to 6, to remove a valve and cage assembly from the relevant housing in the casing of a reciprocating compressor. It shall be understood that the same device can be used to remove similar machine components from other pieces of machinery.

Referring now to FIGS. 3 to 6, in the illustrated embodiment the anchoring plate 101 and the terminal plate 103 are connected to one another by a plurality of rods 105. In the example shown in the drawings four rods 105 are provided. A different number of rods could be envisaged.

Each road 105 comprises a first end 105A constrained to the anchoring plate 101 and a second end 105B constrained to the terminal plate 103. The rods 105 can have for example a circular cross-section. A slide 107 is movably arranged between the anchoring plate 101 and the terminal plate 103. The rods 105 form a guide for said slide 107. The slide 107 comprises bearings or bushings 109 slidingly engaging the rods 105.

A slide mover is provided, for controlling the movement according to double arrow f107 of the slide 107 between the anchoring plate 101 and the terminal plate 103. In the exemplary embodiment disclosed in the drawings, the slide mover comprises a threaded bar 111 which is rotatably supported by a first bearing 113 constrained to the terminal plate 103 and a second bearing 115 constrained to the anchoring plate 101. The end of the threaded bar 111 projecting beyond the bearing 113 is torsionally connected to a crank 117. The threaded bar 111 meshes with a nut 119 constrained to the slide 107. Rotation of the crank 117 in one direction or other causes the slide 107 to move according to double arrow f107 between the anchoring plate 101 and the terminal plate 103.

The anchoring plate 101 is provided with a plurality of through holes 121, 123. As will become clearer from the following description of the manner of using the device 100, the holes 121 and/or the holes 123 are used to lock the anchoring plate 101 and the entire device 100 to the casing of the compressor by means of the stud bolts which are provided on the casing for mounting the cover of the respective valve housing from which the valve and cage assembly must be removed by means of the device 100.

Since the same machine or different machines of the same compressor train can comprise valve housings of different dimensions and/or having different stud bolts arrangements, in some embodiments, as illustrated by way of example in the drawings, the anchoring plate 101 comprises at least two sets of through holes 121 and 123, respectively, which are alternatively used to connect the anchoring plate 101 to either one or the other of different valve housings having differently arranged stud bolts. This allows the same device 100 to be used for removing all valve and cage assemblies of a machine or even of different machines of the same installation. In other, less advantageous embodiments, only one set of through holes 121 or 123 can be provided on the anchoring plate 101.

The device 100 further comprises eyebolts 127 screwed to the slide 107, used for handling the device 100 as will explained later on.

The device 100 further comprises a connecting arrangement for connecting the slide 107 to the valve and cage assembly to be removed from the relevant valve housing. The connecting arrangement is labeled 130. In some embodiments the connecting arrangement 130 comprises a tie rod 131 having a first tie-rod end 131A and a second tie-rod end 131B. The first tie-rod end 131A has an inner threaded hole designed for connection to the central screw 35 of an automatic ring valve, again labeled 27, which may be removed from the relevant valve housing. The opposite second tie-rod end 131B has an outer threading, which extends along a portion of the axial extension of the tie-rod 131, for the purposes which will become clearer later on.

The connecting arrangement 130 further comprises a cage blocking member 133. The cage blocking member 133 is approximately U-shaped or C-shaped and has a central through hole through which the tie-rod 131 can extend. A nut 135 is used to retain the cage blocking member 133 on the tie-rod 131. A further nut 137 is provided for locking the tie-rod 131 to the slide 107 when the device 100 is used for removing a valve and cage assembly from the relevant housing, as will be described in greater detail here below in connection with FIGS. 7A-7P.

The slide 107 has a seat 107A which can be laterally open and into which the terminal portion of the tie-rod 131 can be introduced, projecting beyond the slide 107 towards the anchoring plate 103, so that the nut 137 can be screwed on the second end 131B of the tie-rod 131.

In the embodiment illustrated in the drawings the device 100 further comprises an anti-slip plug 141 designed for insertion into one of the apertures of the cage to be removed, for temporarily retaining the cage in place, after removal of the cover and before the device 100 is properly connected to the compressor casing. The anti-slip plug prevents the valve and cage assembly from accidentally slipping out of the housing under the effect of gravity.

Having described the main components of the device 100, the manner of using it for removing a valve and cage assembly from the relevant housing in the casing of a reciprocating compressor will now be described in detail, reference being made to the sequence of FIGS. 7A-7P. The valve and cage assembly and the valve housing are substantially the same as described here above in connection with FIGS. 1 and 2 and the same reference numbers are used to designate identical or corresponding parts and components.

In FIG. 7A a valve housing 39 provided in a casing 3 of a reciprocating compressor is shown, after removal of the cover. The stud bolts used to lock the cover on the casing 3 of the compressor are labeled 45. In the embodiment shown in FIG. 7A, six stud bolts 45 are provided.

Similarly to what has been described above in connection with FIG. 2, an automatic ring valve 27 is housed in the housing 39, along with the relevant cage 41. The cage 41 is provided with apertures 42 for fluid communication between the delivery duct 25 and the interior of the cage 41.

In FIG. 7A a retaining ring 47 is also shown, which retains the cage 41 and the valve 27 in the housing 39.

In one mode of use, the anti-slip plug 141 is introduced into one of the apertures 42. The anti-slip plug 141 can be provided with elastic projections 141A, extending radially from the anti-slip plug 141 in two diametrically opposed positions. The elastic projections 141A are used to lock the anti-slip plug 141 in the aperture 42 of the cage 41 after insertion, by rotating the anti-slip plug 141 around 90°, compare FIGS. 4 and 5. In FIG. 7B the anti-slip plug 141 is shown in the inserted position, before rotation around 90° according to arrow f141, to achieve the final locked position.

The anti-slip plug 141 is now safely engaged in the aperture 42 of the cage 41 and prevents the valve and cage assembly 27, 41 from slipping out of the housing 39 after removal of the retaining ring 47. The operator can thus perform the subsequent steps of the valve and cage assembly removal under safety conditions.

Figure 7C:
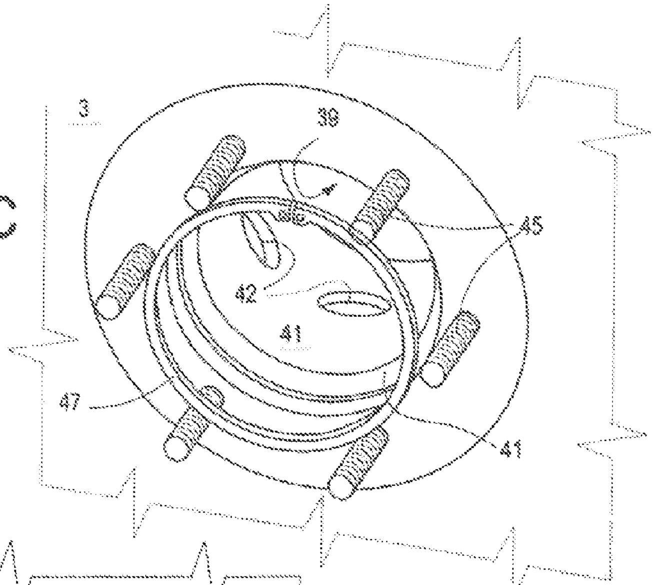

The next step provides for the removal of the retention ring 47 (see FIG. 7C). The cage 41 is prevented from slipping out of the housing 39 by the interference between the anti-slip plug 141, which projects beyond the outer surface of the cage 41, and the discharge duct 25 provided in the compressor casing 3.

The next step consists in attaching the tie-rod 131 to the screw 35 of the valve 27 arranged inside the valve housing 39. This is obtained by screwing the first end 131A of the tie-rod 131 on the screw 35.

Figure 7D:
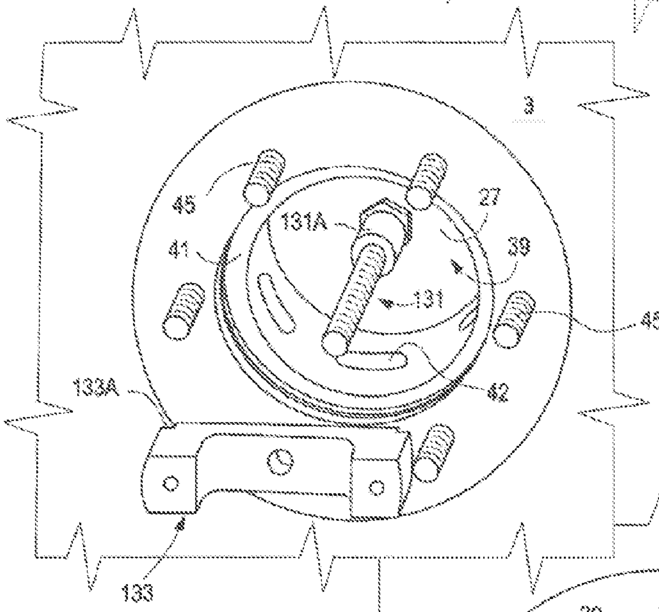
Figure 7E:
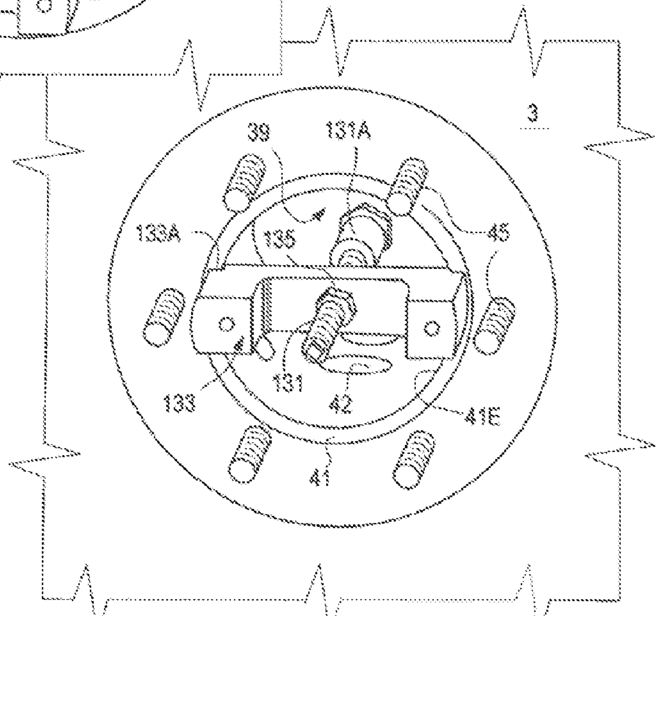

Afterwards (see FIG. 7D), the cage blocking member 133 is mounted on the tie-rod 131 and locked thereon as shown in FIG. 7E by screwing the nut 135. The cage blocking member 133 can be provided with two lateral indentation 133A co-acting with the circular edge 41E of the cage 41 facing outwardly with respect to the housing 39. Thus, the cage blocking member 133 is now locked between the nut 135 and the circular edge 41E of the cage 41 and the valve 27 is constrained to the cage 41 by means of the tie-rod 131.

Figure 7F:
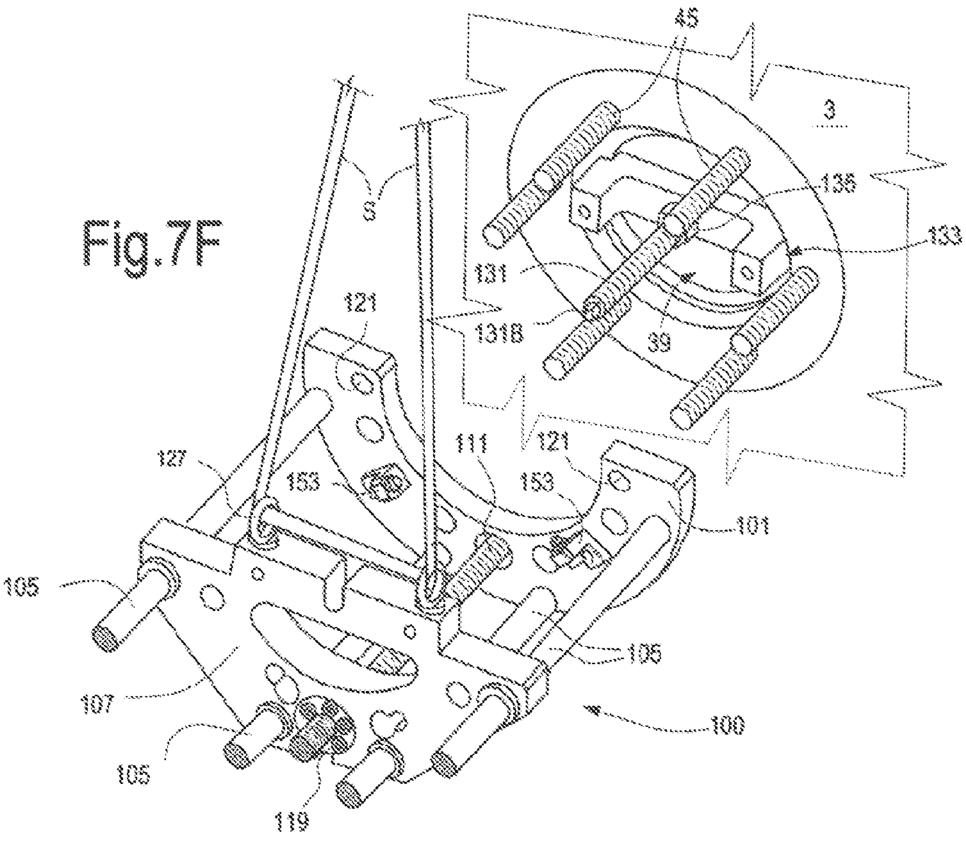

The next step is shown in FIG. 7F. The unit formed by the anchoring plate 101, the terminal plate 103, the slide 107, the rods 105 and the other members connected thereto is brought towards the housing from which the valve and cage assembly 27, 41 must be removed. A strap S can be used for easily handling the device 100. The strap S can be passed through the eyebolts 127 provided on the slide 107.

Figure 7G:
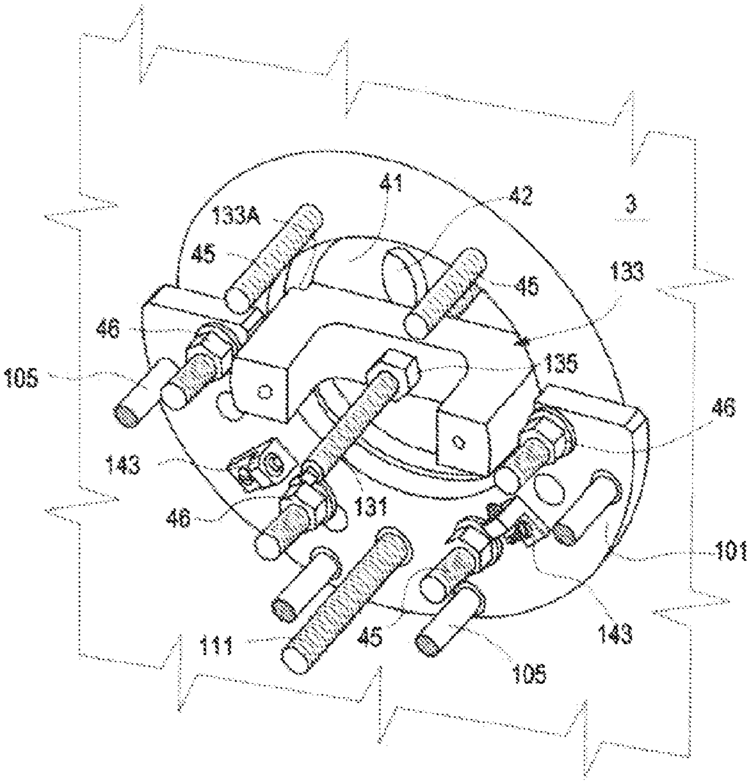

As can be seen in the subsequent FIG. 7G, the device 100 is moved against the compressor casing 3 so that the stud bolts 45 are introduced through the holes 121 or 123 of the anchoring plate 101, so as to project therefrom. The anchoring plate 101 is then attached to the compressor casing 3 by screwing the nuts 46 on the stud bolts 45.

During transportation of the device 100 towards the compressor casing 3 the slide 107 is positioned in an intermediate position between the anchoring plate 101 and the terminal plate 103, so that the device 100 is balanced and can easily be suspended on strap S for approaching the compressor casing 3.

As noted above, the anchoring plate 101 is semi-circular in shape and the inner radius thereof is slightly larger than the radius of the valve housing 39. Once the anchoring plate 101 is constrained to the compressor casing 3, the cage blocking member 133 projects through the anchoring plate 101 and the tie rod 141 projects beyond the cage blocking member 133 towards the terminal plate 103 of the device 100.

Figure 7H:
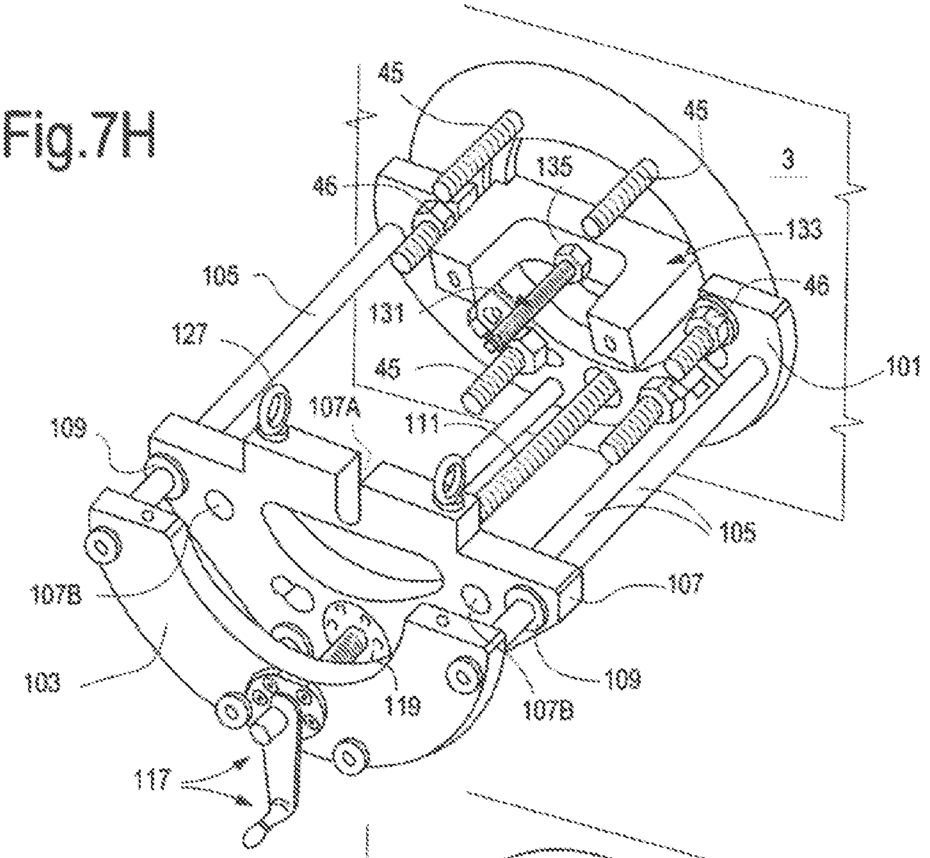
Figure 7I:
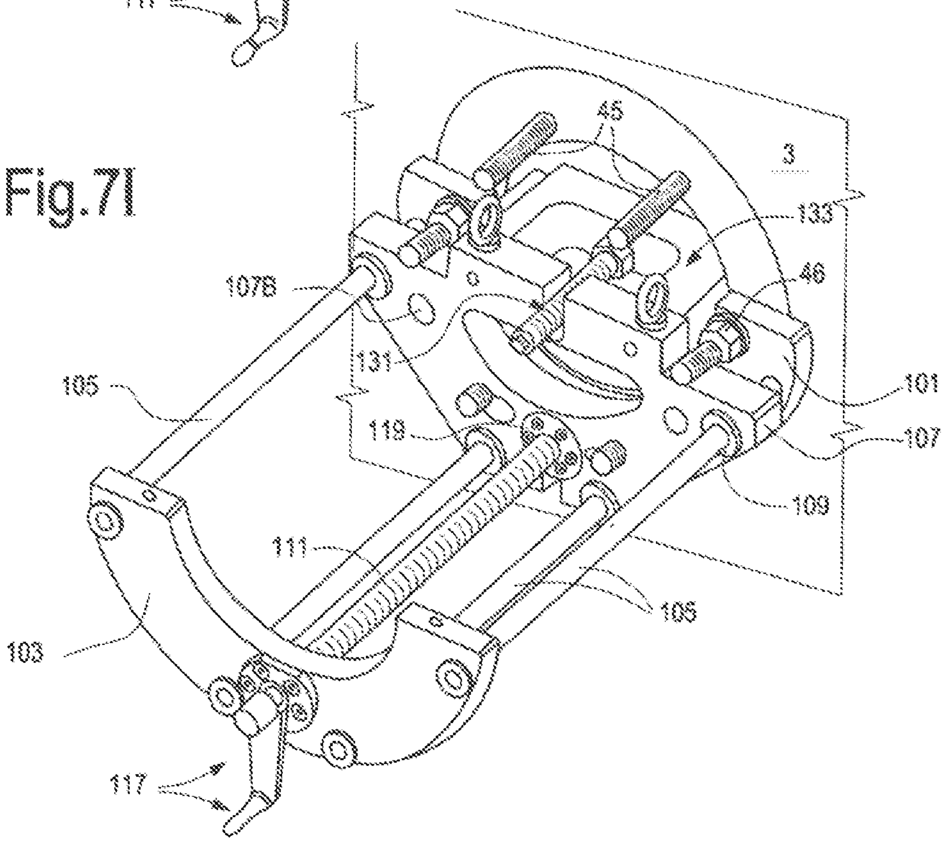
Figure 7J:
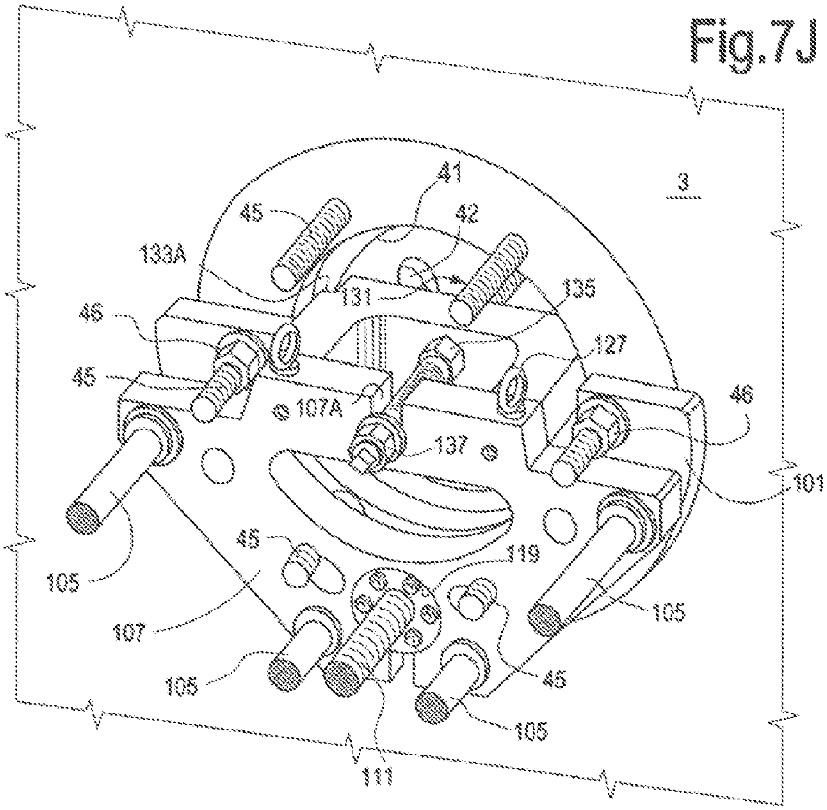

The slide 107 can now be moved along the guide bars 105, by rotating the crank 117, towards the anchoring plate 101 as shown in FIGS. 7H and 7I. In the final position of FIG. 7I, the slide 107 is positioned at such a distance from the anchoring plate 101 that the second end 131B of the tie-rod 131 projects beyond the slide 107 through the aperture 107A and the nut 137 can be screwed on the end 131B of the tie-rod 131, as shown in FIG. 7J. In this manner the tie-rod 131, the cage blocking member 133, the cage 41 and the valve 27 are connected to the slide 107.

The slide 107 is provided with through holes 107B arranged in the same position as the through holes 121, 123 of the anchoring plate 101, so that the stud bolts 45 can extend through the slide 107 when the latter is positioned adjacent the compressor casing 3.

Figure 7K:
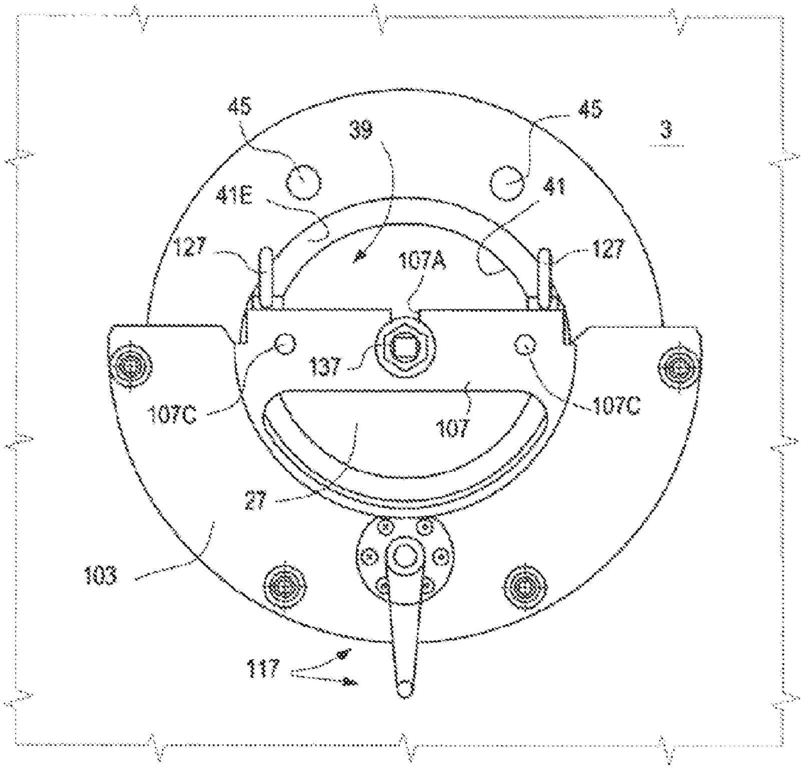

Since the slide 107 is in turn connected, through the bars 105 and the anchoring plate 101 to the compressor casing 3, the anti-slip plug 141 can now be removed without any risk of the valve and cage assembly slipping out accidentally from the housing 39. This step is illustrated in FIG. 7K.

Figure 7L:
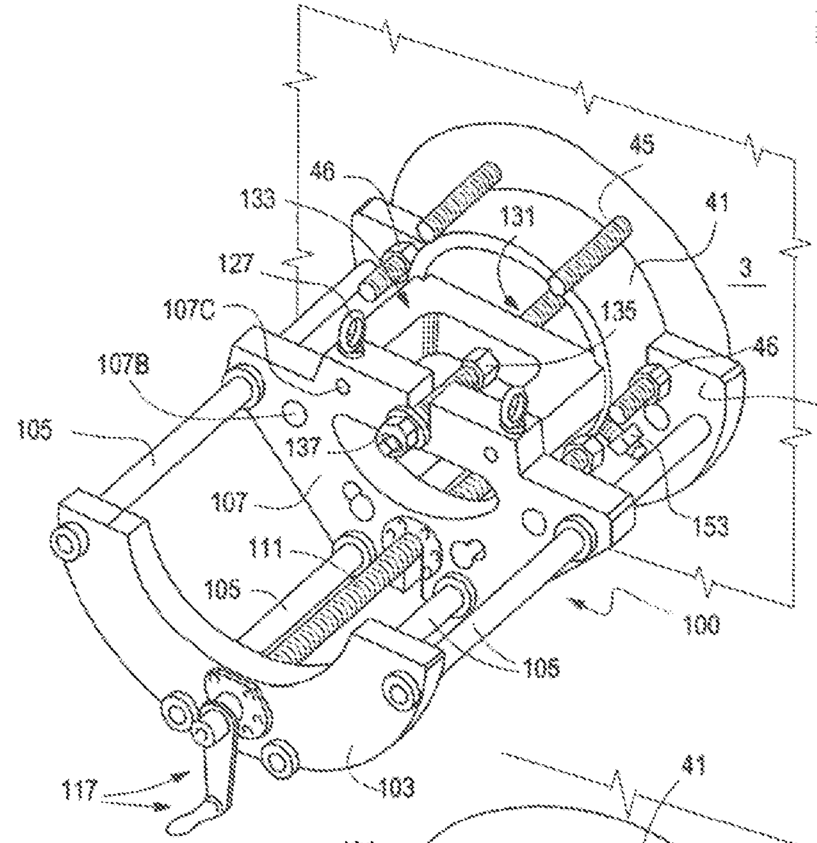
Figure 7M:
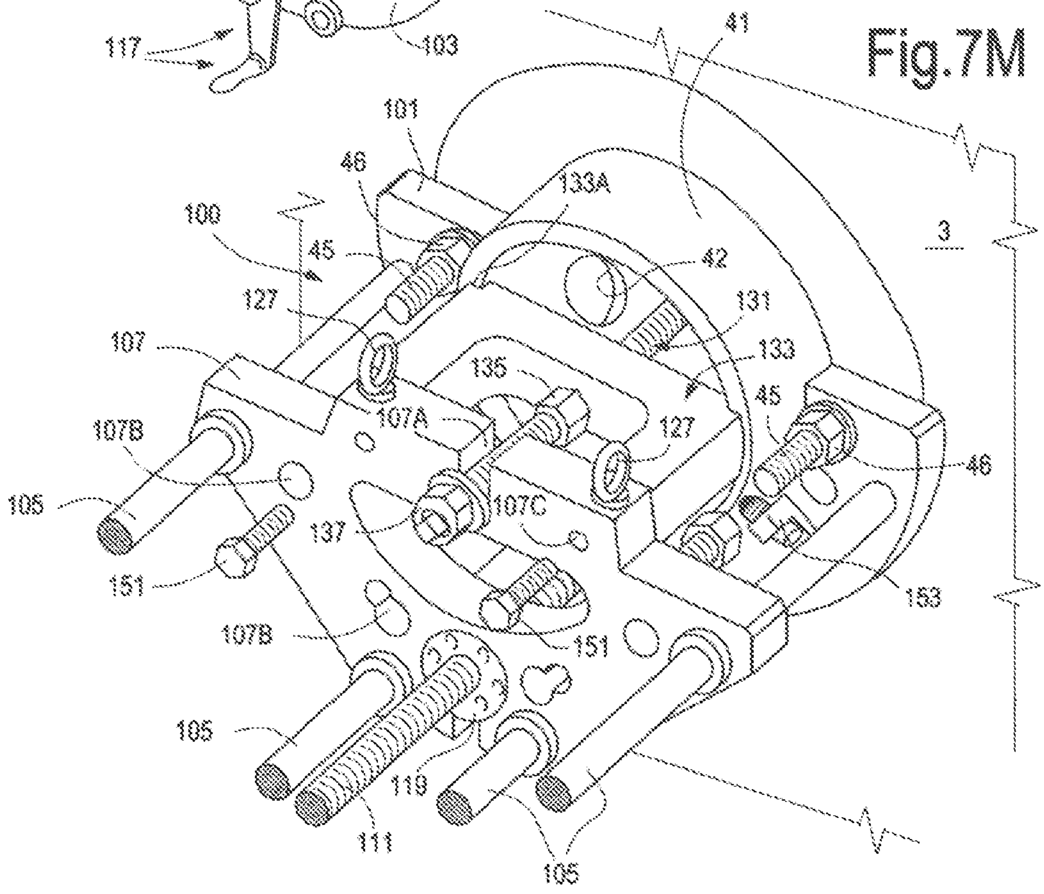

Subsequently the crank 117 is rotated to move the slide 107 away from the compressor casing 3 as shown in FIG. 7L. The valve and cage assembly 27, 41 is thus drawn out of the housing 39 by the traction applied by the slide 107 through the rotation of the threaded bar 111. If needed, a more stable connection between the slide 107 and the cage blocking member 133 can be obtained by means of auxiliary screws introduced in through holes 107C provided in the slide 107 and screwed into threaded holes 133H provided in the cage blocking member 133. The auxiliary screws, indicated with the reference number 151, are schematically shown in FIG. 7M.

Figure 2:
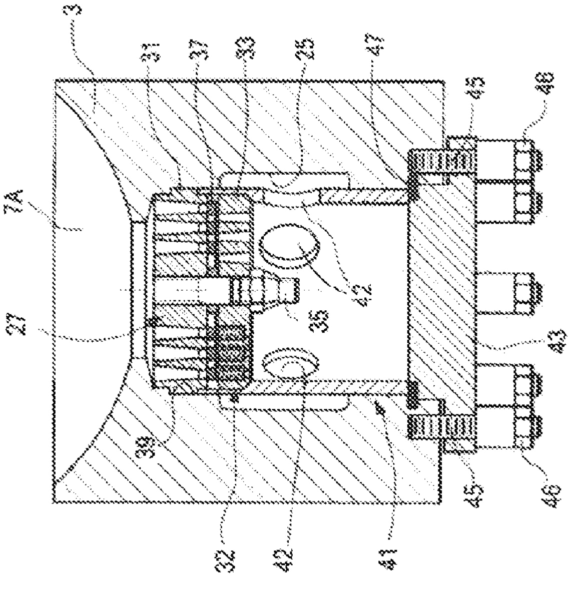
FIG. 2 illustrates a sectional view of a discharge valve and cage assembly of the compressor of FIG. 1, in a section along line II-II of FIG. 1.
Figure 3:
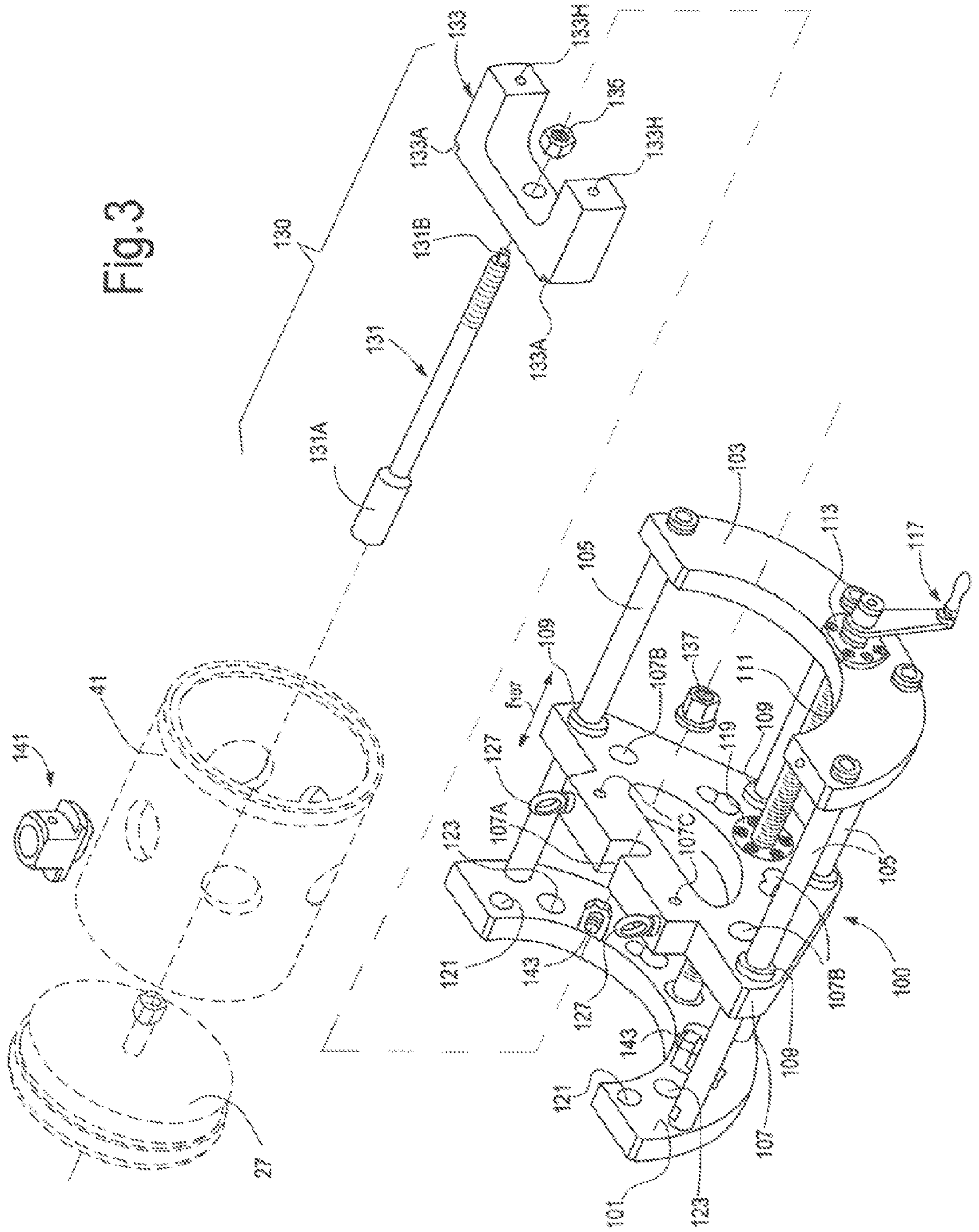
FIG. 3 illustrates a perspective and partially exploded view of a valve and cage removal device according to the present disclosure.
Figure 4:
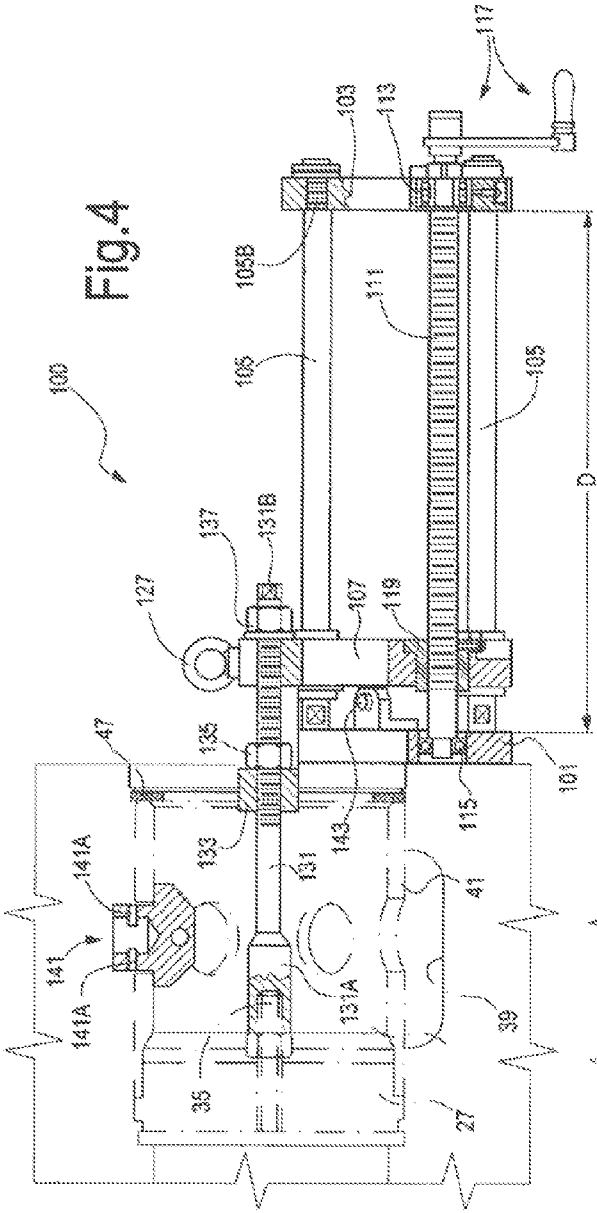
FIG. 4 illustrates a side and partially sectional view of the device of FIG. 3 in the starting position, at the beginning of a valve and cage removal process.
Figure 5:
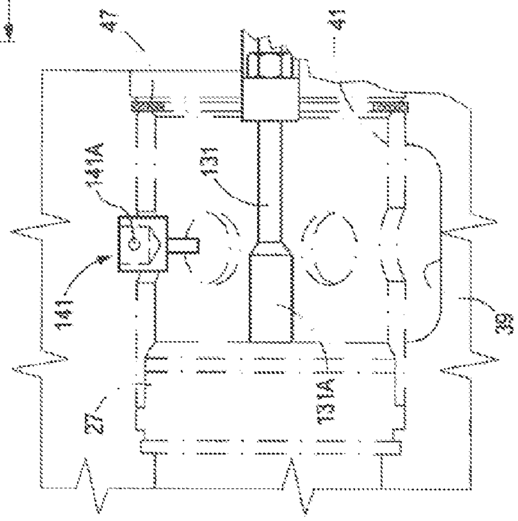
FIG. 5 illustrates a detail of the device of FIG. 4, with the anti-slip plug rotated in the locked position.
Figure 6:
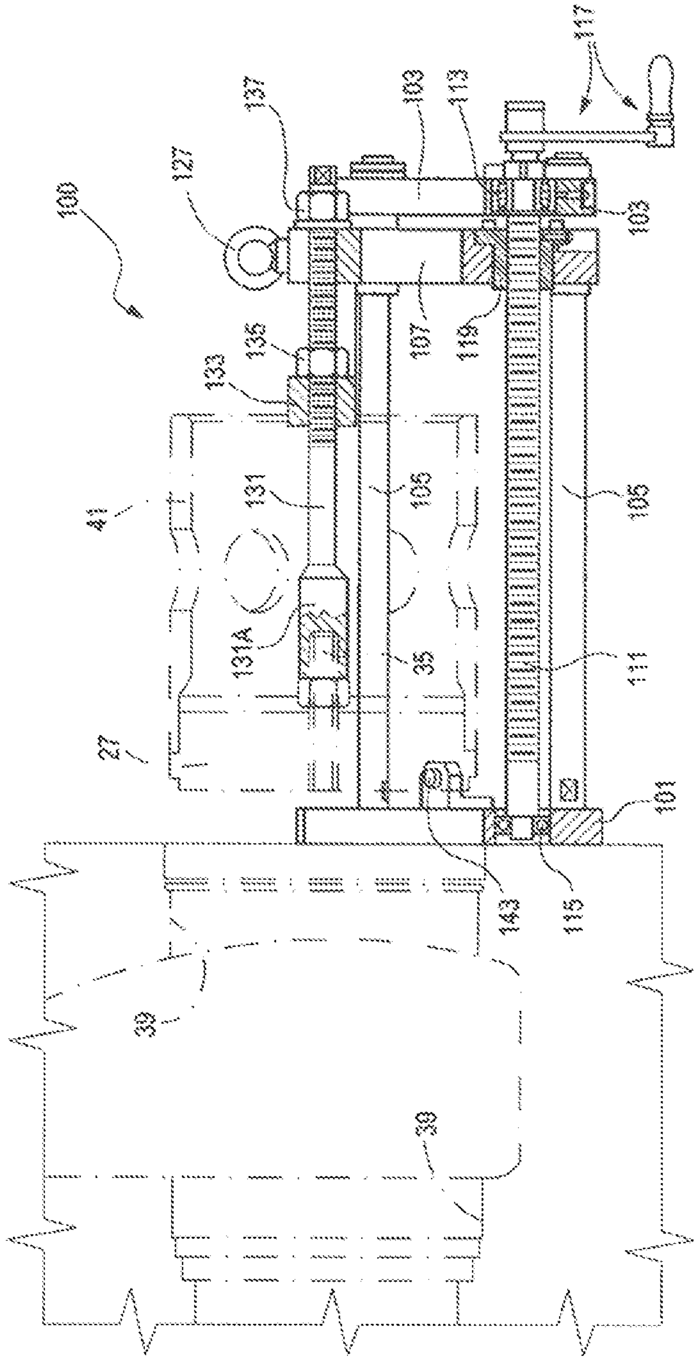
FIG. 6 illustrates similarly to FIG. 4 the device in the position reached after complete extraction of the valve and cage assembly from the valve housing provided in the casing of the reciprocating machine.
Figure 7N:
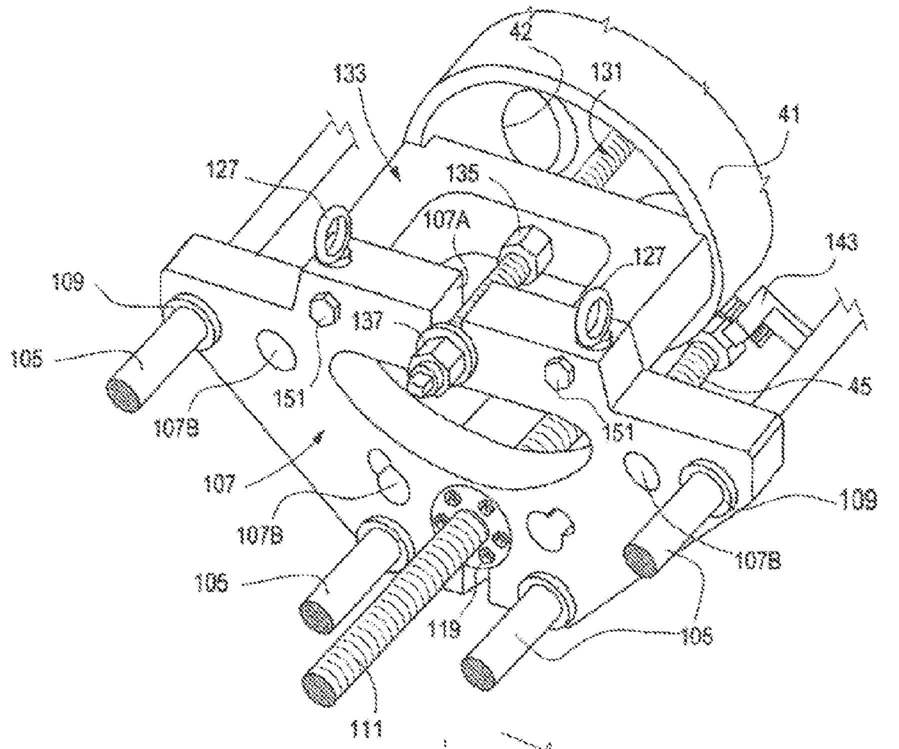

The device 100 can be provided with a pair of supporting members 143 constrained to the anchoring plate 101, as shown in particular in FIGS. 1 and 7N. The supporting members 143 can be comprised of spherical tips on which the cage 41 can rest during the extraction movement, so that the weight of the valve and cage assembly 27, 41 will not be entirely supported by the tie rod 131.

Figure 7O:
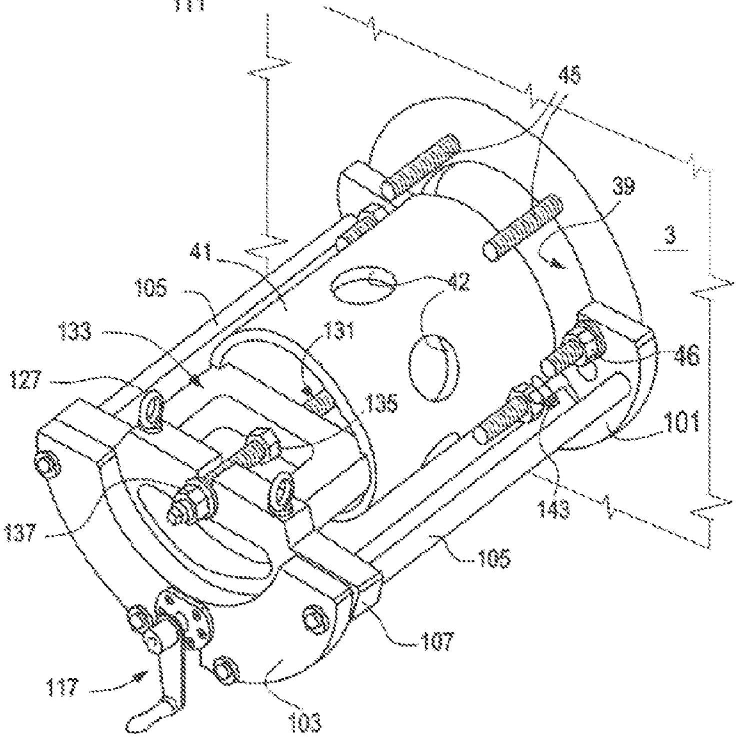
Figure 7P:
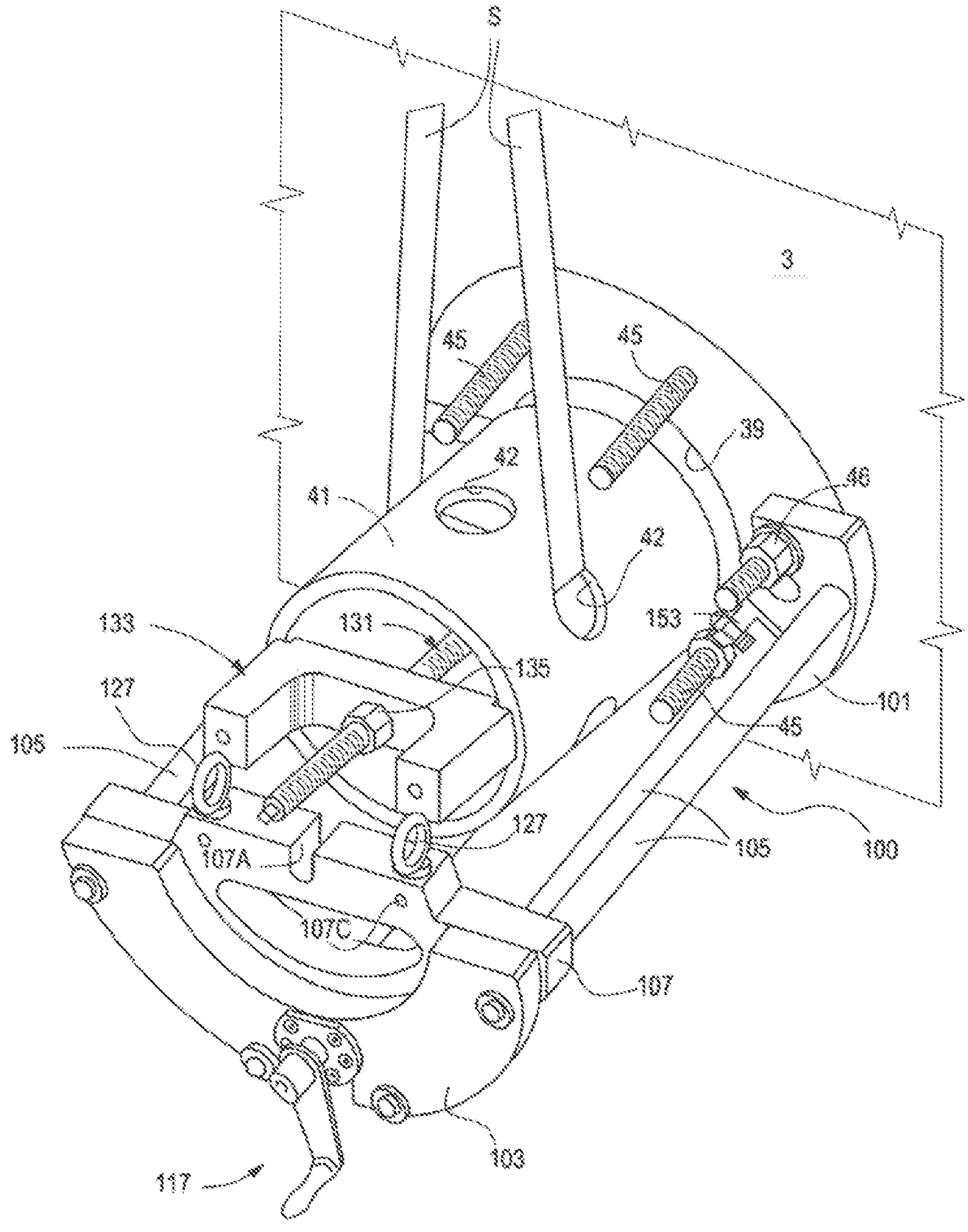

FIGS. 7O and 7P show the final stages of the removal of the valve and cage assembly 27, 41. Once the valve and cage assembly is entirely extracted from the housing 39 (FIG. 7O), the strap S can be used to engage the cage 41 by passing said strap S through apertures 42 of the cage 41 and the nut 137 can be removed so that the valve and cage assembly 27, 41 can be removed from the device 100 along with the tie-rod 131 and the cage blocking member 133 (FIG. 7P).

While the disclosed embodiments of the subject matter described herein have been shown in the drawings and fully described above with particularity and detail in connection with several exemplary embodiments, it will be apparent to those of ordinary skill in the art that many modifications, changes, and omissions are possible without materially departing from the novel teachings, the principles and concepts set forth herein, and advantages of the subject matter recited in the appended claims. Hence, the proper scope of the disclosed innovations should be determined only by the broadest interpretation of the appended claims so as to encompass all such modifications, changes, and omissions. In addition, the order or sequence of any process or method steps may be varied or re-sequenced according to alternative embodiments.

What is claimed is:

1. A device for removing a valve and cage assembly from a valve housing of a machine casing, the device comprising: an anchoring plate configured for anchoring the device to the machine casing; a terminal plate connected to the anchoring plate at a distance there from; a slide arranged for movement between the anchoring plate and the terminal plate; and a connecting arrangement configured for connecting the slide to a valve and cage assembly to be removed from the valve housing: and a cage blocking member removably engageable to a tie-rod in a position between a first end and a second end, and extending transversely to the tie-rod when mounted thereon, wherein the cage blocking member is provided with threaded holes for auxiliary screws, connecting the cage blocking member to the slide.

2. The device according to claim 1, further comprising a guide extending between the anchoring plate and the terminal plate, the slide being slidingly movable along the guide.

3. The device according to claim 2, wherein the guide comprises a plurality of guiding bars having first ends constrained to the anchoring plate and second ends constrained to the terminal plate, and wherein the slide comprises bushes arranged for sliding movement along the guiding bars.

4. The device according to claim 1, further comprising a slide mover for moving the slide along a guide between the anchoring plate and the terminal plate.

5. The device according to claim 4, wherein the slide mover comprises a threaded bar rotatably supported by the terminal plate and the anchoring plate, and meshing with a nut constrained to the slide.

6. The device according to claim 1, wherein the connecting arrangement comprises the tie-rod with the first end, configured for connection to a valve to be removed, and with the second end, configured for connection to the slide.

7. The device according to claim 1, wherein the slide is provided with an aperture extending through the slide, arranged for receiving and locking the tie-rod to the slide by means of a locking member.

8. The device according to claim 6, wherein the tie-rod has at least a threaded portion extending to the second end.

9. The device according to claim 1, wherein the anchoring plate comprises a plurality of through holes for connection to stud bolts on the machine casing.

10. The device according to claim 1, wherein the anchoring plate comprises a plurality of sets of through holes for alternative connection to different sets of stud bolts.

11. The device according to claim 1, wherein the slide comprises apertures for receiving stud bolts when the slide is moved adjacent the machine casing.

12. The device according to claim 1, further comprising an anti-slip plug configured for insertion into an aperture of a cage, preventing accidental slipping of the valve and cage under the effect of gravity.

13. The device according to claim 1, wherein the anchoring plate has an approximately semi-circular shape.

14. The device according to claim 1, wherein the terminal plate has an approximately semi-circular shape.

15. The device according to claim 1, further comprising at least one eyebolt.

16. The device according to claim 15, wherein the at least one eyebolt is engaged to the slide.

17. The device according to claim 15, comprising two eyebolts engaged to the slide.

18. The device according to claim 1, further comprising a support member arranged and configured to support the valve and cage assembly once the valve and cage assembly is removed from the valve housing.

19. The device according to claim 18, wherein the support member is arranged on the anchoring plate.

20. A system comprising: a reciprocating compressor with at least one valve and cage assembly; and a device for removing a valve and cage assembly from a valve housing of a machine casing, the device comprising: an anchoring plate configured for anchoring the device to the machine casing; a terminal plate connected to the anchoring plate at a distance there from; a slide arranged for movement between the anchoring plate and the terminal plate; a connecting arrangement configured for connecting the slide to a valve and cage assembly to be removed from the valve housing; and a cage blocking member removably engageable to a tie-rod in a position between a first end and a second end, and extending transversely to the tie-rod when mounted thereon, wherein the cage blocking member is provided with threaded holes for auxiliary screws, connecting the cage blocking member to the slide.

* * * * *